(12) United States Patent
Brux et al.

(10) Patent No.: US 8,713,229 B2
(45) Date of Patent: Apr. 29, 2014

(54) SENSOR INTERFACE ENGINEERING

(75) Inventors: Martin Brux, Oberreichenbach (DE); Kai Gäbel, Neukirchen (DE); Klaus Hermes, Geltendorf (DE); Martin Kiesel, Poxdorf (DE); Raimund Kram, Erlangen (DE); Rainer Möhring, Röthlein (DE); Manfred Popp, Zirndorf (DE); Haiko Schmidt, Chemnitz (DE); Andreas Uhl, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 99 days.

(21) Appl. No.: 13/302,449

(22) Filed: Nov. 22, 2011

(65) Prior Publication Data
US 2012/0303847 A1 Nov. 29, 2012

(30) Foreign Application Priority Data
Nov. 23, 2010 (EP) .................... 10192254

(51) Int. Cl.
G06F 13/00 (2006.01)
(52) U.S. Cl.
USPC .......................... 710/100; 710/305
(58) Field of Classification Search
USPC ......................... 710/100, 305, 8–9
See application file for complete search history.

(56) References Cited

U.S. PATENT DOCUMENTS

| 6,456,222 B1 * | 9/2002 | Agne ..................... 341/157 |
| 2009/0072986 A1 * | 3/2009 | Bussert et al. ............. 340/679 |

FOREIGN PATENT DOCUMENTS

| DE | 101 00 56 A1 | 7/2002 |
| DE | 101 25 608 A1 | 12/2002 |
| EP | 0 560 226 A2 | 9/1993 |
| EP | 1 273 482 A2 | 1/2003 |
| EP | 1 906 286 A1 | 4/2008 |
| EP | 1 969 434 A1 | 9/2008 |
| EP | 2 249 217 A1 | 11/2010 |

* cited by examiner

Primary Examiner — Ryan Stiglic
Assistant Examiner — Kim Huynh
(74) Attorney, Agent, or Firm — Henry M Feiereisen LLC

(57) ABSTRACT

A method for communication between function modules in drive engineering is described, wherein a first function module has a first sensor interface, wherein a second function module has a second sensor interface, wherein the first sensor interface is functionally assigned to the second sensor interface, wherein the first function module is assigned to a first automation component, wherein the second function module is assigned to a second automation component, wherein an address, in particular a logical address, for the transfer of sensor data is automatically specified.

6 Claims, 11 Drawing Sheets

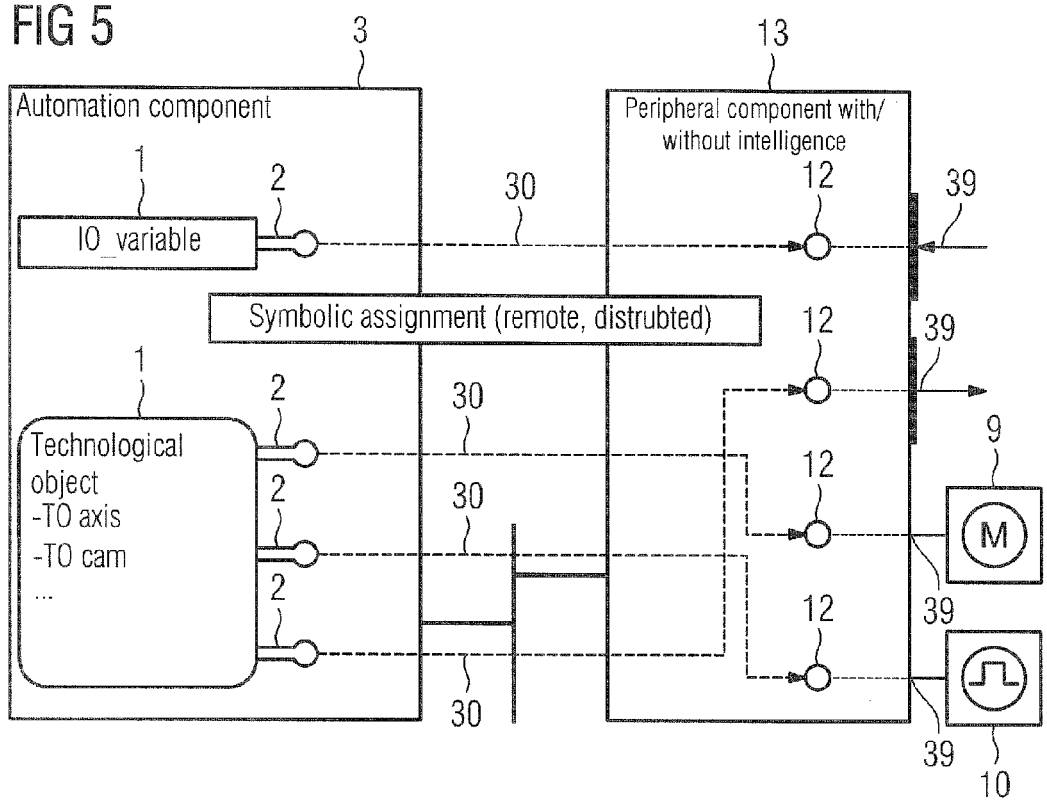
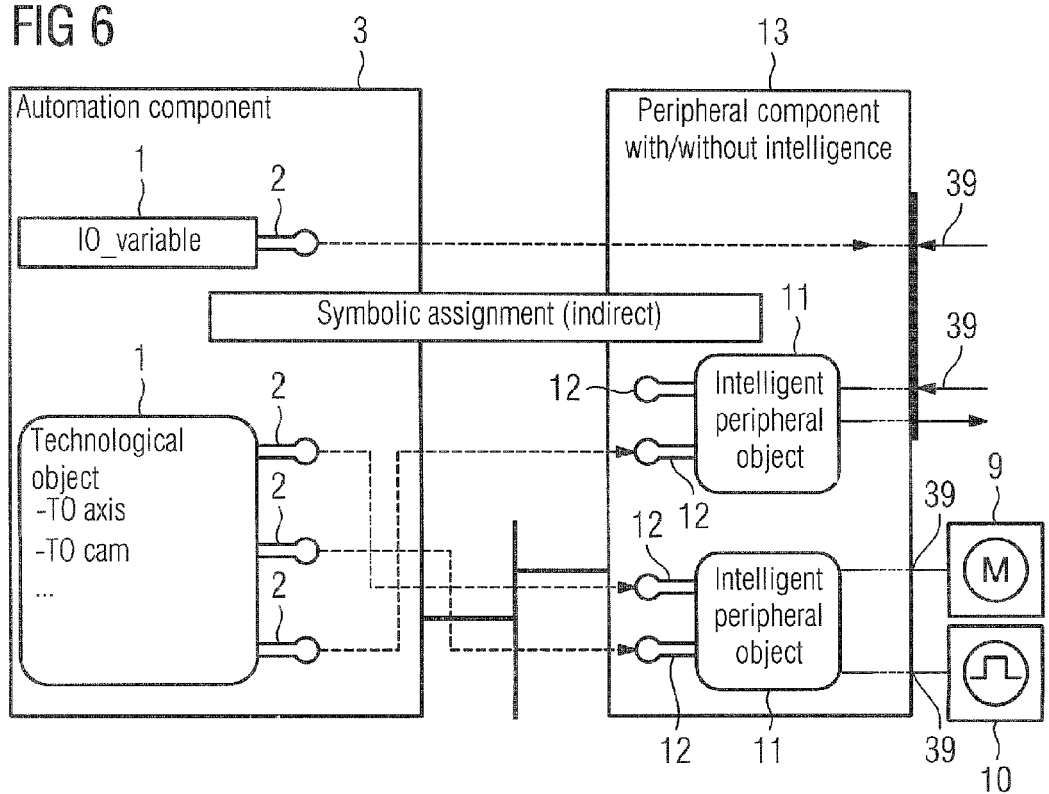

FIG 9

Close broken links

Please select the objects to which the broken interconnections should point

| Source / old destination ① | Destination object ② | | Interface |
|---|---|---|---|
| ⊞ 🔒 Sinamics_Integrated._Drive_1 | Sinamics_Integrated._Drive_1 | ▼ | * |
| Axis_1Actor | | | Actor |
| Axis_1Encoder_1  ③ | | | Encoder_1 |
| External sensor_1 encoder | | | Encoder_2 |
| IOVar_1 | | | BICO_IW.r345 |
| IOVar_2 | | | BICO_OW.p2099[0] |
| ⊞ 🔒 Sinamics_Integrated._OldDrive | Sinamics_Integrated._NewDrive | ▼ | * |
| ⊞ 🔒 Sinamics_Integrated.TM31_1 | -- no compatible object ④ | ▼ | * |
| ⊞ 🔒 Sinamics_Integrated._Drive_2 | -- individual ⑤ | ▼ | * |
| Axis_2Actor | Sinamics_Integrated._Drive_2 | ▼ | Actor |
| Axis_2Encoder_1 | Sinamics_Integrated._Drive_2 | ▼ | Encoder_1 |
| Axis_3Actor | Sinamics_Integrated._Drive_3 | ▼ | Actor |
| Axis_3Encoder_1 | Sinamics_Integrated._Drive_3 | ▼ | Encoder_1 |
| | | | |
| | | | |
| | | | |
| | | | |
| | | | |

[ OK ]  [ Cancel ]  [ Help ]

| C435 ▼ : Address list | | | | | | | | | |
|---|---|---|---|---|---|---|---|---|---|
| Connect | using symbolic drawings ▼ | | | | | | | | |

| | (-) TO interface | Interface type | Status | I/O variable | I/O address | Read only | Data type | Reference | Reference |
|---|---|---|---|---|---|---|---|---|---|
| ✕ | Filter selection ▼ | Filter selection ▼ | Filter ▼ | Filter select. ▼ | Filter select. ▼ | Filter sel. ▼ | Filter sel. ▼ | Filter selection | Filter ▼ |
| 1 | | | | myInput | PIW 256 | ☐ | INT | | |
| 2 | | | | myOutput | PQW 256 | | WORD | | |
| 3 | TO-Axis-Blue | | | | | | | | |
| 4 | TO-Axis-Red | | | | | | | | |
| 5 | Actor | ActorProfidrive | i:active | | | | | Actor X | 4:Set up |
| 6 | Encoder_1 | SensorProfidrive | i:active | | | | | Encoder Y | 4:Set up |
| 7 | XYZ_1 | BitInput | i:active | | | | | Not interconnected | 0:Not defi. |
| 8 | XYZ_2 | BitInput | i:active | | | | | Not interconnected | 0:Not defi. |
| 9 | XYZ_3 | BitInput | i:active | | | | | Not interconnected | 0:Not defi. |
| 10 | XYZ_4 | BitInput | i:active | | | | | Not interconnected | 0:Not defi. |
| 11 | | | | X1 | Input | | WORD | Z1 | 4:Set up |
| 12 | | | | X2 | Output | ☑ | WORD | Z2 | 4:Set up |
| 13 | | | | | | | | | |

Axis configuration Axis_1 drive assignment

| Drive assignment | | ⊟ Assignment partner | Assignment |
|---|---|---|---|
| | 🝖 | No filter | No filter |
| | 1 | >Do not assign | |
| | 2 | ⊟ 📇 SINAMICS_Integated | Enter drive |
| | 3 | ─ 🗂 Drive_1 | |
| | 4 | ─⊟ 🗂 Drive_1 | |
| | 5 | ─ Actor | 1x assigned |
| | 6 | ⊟ 🗂 Drive_2 | |
| | 7 | ─ Actor | Free |

The connection to a ... can be ... on this side

< Back    Next >    Cancel    Help

SENSOR INTERFACE ENGINEERING

CROSS-REFERENCES TO RELATED APPLICATIONS

This application claims the priority of European Patent Application, Serial No. EP10192254, filed Nov. 23, 2010, pursuant to 35 U.S.C. 119(a)-(d), the content of which is incorporated herein by reference in its entirety as if fully set forth herein.

BACKGROUND OF THE INVENTION

The present invention relates to engineering of data communication in particular for sensors in an industrial automation environment.

The following discussion of related art is provided to assist the reader in understanding the advantages of the invention, and is not to be construed as an admission that this related art is prior art to this invention.

In industrial automation technology various methods for data communication are known. These relate to, for example, communication bus systems (e.g. Profibus, Ethernet, CAN bus, etc.) as well as sensor interfaces, I/O interfaces and the like. An engineering system can be used for planning such a data communication. For example, logical addresses are allocated in the configuration of data communication. The engineering system can also be designed in such a way that a planner stipulates addresses and/or protocol usage for a bus system. As a rule, this takes place by using alphanumeric characters in an engineering system or in an automation runtime system. Automation concerns, for example, the automation of a machine tool, a press, a printing machine, a packing machine, a hoist, a robot, etc.

It would therefore be desirable and advantageous to obviate prior art shortcomings and to provide an improved approach for engineering data communications.

SUMMARY OF THE INVENTION

According to one aspect of the present invention, a method for communication between function modules in drive engineering, wherein a first function module has a first sensor interface and a second function module has a second sensor interface, includes the steps of assigning the first sensor interface functionally to the second sensor interface, assigning the first function module to a first automation component, assigning the second function module to a second automation component, and automatically specify an address for transfer of sensor data.

According to another aspect of the invention, the invention is directed to a method for communication between function modules in drive engineering, wherein a first function module of an automation system has a plurality of sensor interfaces, wherein a second function module of a peripheral component has a plurality of sensor interfaces, wherein the automation system is connected to the peripheral component for data communication by a communication bus, wherein the peripheral component has hardware ports for a plurality of sensors, wherein the hardware ports are connected with the sensor interfaces of the peripheral component at least for data connection, wherein the sensor interfaces are associated with a communication bus.

A user of an engineering system can be offered a simple, transparent, type-assured, symbolic assignment of interfaces of objects which are on the same or in particular, on different systems. With the aid of the engineering system or also of another system, communication between function modules within a device or between function modules of different devices can be provided, wherein in particular communication takes place across a system. Devices are in particular automation components such as a Stored Program Control (SPC), a motion control unit, an I/O module, a power converter, a host computer, etc. Advantageously, for example, a simple, transparent and yet flexible assignment of I/O points, terminals, or of axes to drive objects, which are on integrated or individual systems can take place.

By abstracting the communication connections between communications interfaces it is, for example, no longer necessary to stipulate a manual assignment via storage in a peripheral area, e.g. by specifying the log. address, or by means of a fixed assignment in a closed system.

In a method for communication between function modules in automation technology a first function module has a first communication interface. The function module is in particular a software module with a special function (e.g. a technology module, a regulator module, a drive module, a logic module, etc.). The function module has a communication interface, the function module being able to exchange data via the communication interface e.g. with other modules. Communication interfaces can be various types, wherein interfaces that are connected together are of a compatible or the same type. A second function module therefore has a second communication interface, wherein the first communication interface is assigned to the second communication interface, wherein the assignment is stored. The assignment takes place, for example, by means of a graphical system (e.g. of an engineering system, programming system, monitoring system, etc.). It is e.g. possible to connect two communication interfaces graphically by means of a mouse pointer to indicate or to program a communication connection. Advantageously the system checks whether the types match and permits the connection or denies it or sends out a message which indicates a different or incompatible type. The communication interfaces concern different function modules. However, the function modules can be provided, programmed or be executable in the same automation component or in another automation component.

In one embodiment of the method the first function module is assigned to a first automation component and the second function module to a second automation component.

According to an advantageous feature of the present invention, the communication interface(s) may be parameterized and/or modeled. A user can adjust interfaces to the respective requirements. If function modules are based on objects of different types, then these object types are instantiated during programming. The respective types also have a description of possible interfaces. The interfaces with which the object is to be instantiated can be advantageously defined during instantiation. This depends, for example, on the respective function to be performed. For example, an object can be instantiated with one, two, three or more sensor interfaces.

According to an advantageous feature of the present invention, bus-based communication between automation components may be parameterized and/or logical address areas may verified automatically by means of the assignment of interfaces with each other.

According to an advantageous feature of the present invention, communication is parameterized depending on the parameterization and/or modeling of the communication interfaces.

If two sensor interfaces are specified in a function module, a corresponding transmission channel is earmarked.

According to another advantageous feature of the present invention, this can also be managed differently. For example, only if sensor interfaces are connected to each other can corresponding communication (e.g. a channel, or a place in a bus protocol) be provided for this. This provision of communication connections (addresses, or bandwidth) takes place automatically. A user consequently has less work.

According to an advantageous feature of the present invention, a connector for the assignment of communication interfaces may be provided, the connector having connection information. This too can make the programming of communication connections easier. For example, communication interfaces und connectors may be of different respective types, wherein only interfaces and connectors of the same type match and are to be used.

According to an advantageous feature of the present invention, one or two automation components are assigned to a communication bus system. Depending on the type of bus the communication connections between the various function modules of different automation components can be automatically integrated into the bus system.

According to an advantageous feature of the present invention, an assignment of communication interfaces may be denied and/or flagged, if the communication bus system cannot provide the communication which is required for the many communication connections between the automation components.

According to an advantageous feature of the present invention, modeling data may be generated by means of an object-specific script, the function module representing an object. Such a script can, for example, be executed in connection with an instantiation of a function module.

By means of the graphical assignment of communication connections, a simplified assignment of I/O points to I/O interfaces is also produced, for example. For this and also for other communication interfaces the following procedure may be followed, or at least one of these steps executed:

Definition of an automation system
    with the introduction and descrition of I/O interfaces for I/O variables or for the external interfaces of technological objects;
    with the introduction and description of I/O interfaces (communication interfaces) for the I/O points on the same automation system or also for the I/O points on I/O modules that are attached via a communication system, and optionally, the modeling of the external interfaces (communication interfaces) of software objects on intelligent I/O modules, e.g. of external interfaces of drive objects in accordance with PROFIdrive profiles;
Interfaces are modeled (e.g. regarding: designation, type, properties, attributes, current information (existing connection, not yet interconnected, . . . ));
The modeling data is generated via object type-specific scripts, the object-specific script files being supplied in particular to the objects, modules, components or in the dedicated engineering system;
Via the modeling data compatible 'partner' interfaces can be selected for a selected I/O interface und be assigned in a type-assured manner, wherein in particular only type-compatible interfaces can be interconnected;
The interfaces are given symbolic names, and are thus easier for the user to select/assign and manage;
The selection procedure is further supported via modeled properties of the interfaces;
The terminal designation, for example, can also be modeled as an attribute at the interface.

The assignments are retained and stored by means of connectors or connections;
Internal communication is ascertained by the system depending on the assignments and functions that have been set, wherein in particular one of the following steps takes place: an automatic telegram setting, an automatic communication configuration (e.g. specification of the PROFIdrive telegram, a telegram extension and/or logical addressing).

The user then works at a technological and symbolic level and not in the log, address range. The logical address range is advantageously concealed.

According to the interface connections and the functionality that has been set, communication is established by the system (communication environment (logical address range) and communication content (telegrams)). This takes place e.g. via an implicit procedure (e.g. by implementing the engineering project) or based on an explicit action.

According to an advantageous feature of the present invention, a function module may relate to a motion control unit, wherein using a DSC method velocity precontrol, position regulator gain and the difference between target and actual position are transmitted to the drive as control-relevant signals. These signals can be advantageously combined in a single interface and form an interface type. Only interfaces of this type can then be connected to each other. The drive, which has a module with an interface of this type, then produces the actual position set point. The position control takes place in the drive. The effective tracking error is simulated in the control when using the DSC method.

For a clear representation and simple alteration and/or correction of I/O interface connections, a user may be provided with a tool intended for this purpose. This serves to provide a clear display of the interconnection of interfaces and if applicable, alteration/correction of the interconnections, wherein these communication interfaces, in other words the I/O interfaces, are modeled via I/O interface description data. Such a tool (system for handling communication connections) may, for example, have at least one of the following functions:

Representation of the output interface and the respective connected partner interface,
Display of the I/O interface type,
Identification of non-interconnected output interfaces, i.e. respective partner interfaces missing,
Identification of 'breakaway' partner interfaces, e.g. as a result of elimination of the partner from the plan;
Identification of modification of the interconnection information, e.g. as a result of renaming of the output interface or of the interconnection partner,
Simple repair of faulty (incorrect) interconnections by means of entry of valid, type-compatible interfaces,
Simple specification of the interconnection partner via an alphanumeric identifier signal,
Establishment of interconnections by calling a subprogram, and
Display of the interface type of the individual interconnections.

Functions such as display interconnection, edit interconnection, and correct interconnection can be realized in one tool or in various tools. The use of a graphical interface is particularly advantageous for the user as this leads to clear display, easy editing, alteration and correction of interface connections (in other words, assignments) and can be based on I/O interface modeling and I/O interface interconnection in the automation systems. When interconnecting interfaces the user may be supported by the descriptive data (e.g. symbolic identifiers, type information, etc.).

For a user a simple, functional/technological selection and assignment of I/O interfaces and components is important regardless of any existing restriction on breadth of communication. This relates to e.g. the simple technological assignment of sensors in a motion control unit, even if these are transmitted e.g. in a PROFIdrive telegram having a maximum of only two sensor channels. It should also be possible to conceal the assignment to the internal sensor channels with flexible configurability of the sensors. It is thus possible to prevent a direct assignment to the corresponding communication channel/address range (e.g. to sensor 1 or sensor 2 in the PROFIdrive telegram). The direct technological assignment of a technological I/O interface (in other words of a technological communication interface) to a specific type-compatible I/O point even without direct assignment to a communication interface is possible through the described abstraction. Thus e.g. in the automation system the sensor can be assigned to a corresponding sensor in a peripheral component.

Through the introduction and evaluation of technological attributes the communication interface can be concealed, wherein the assignment is nevertheless unambiguous. It is no longer necessary for the explicit communication channel to be specified by the user.

An example of such an attribute is the management of sensor signals. For example, the first communication channel in an automation system can only ever be used to transmit the sensor of the drive control, usually the motor sensor; if such a technological criterion is defined at the interface, it is no longer necessary to specify the communication channel when the motor sensor of the axis is being interconnected to a drive.

Through the clear assignment of interfaces for restricted breadth of communication, it is also possible to manage with a limited number of communication channels, which is achieved by the introduction and use of suitable, technological attributes. For example, selected communication channels may only be assigned to selected interfaces with corresponding technology-related attributes. A restricted breadth of communication, as well as a limited number of communication channels, can be concealed by means of the assignment of interfaces via technological attributes which enable definitive mapping onto the channels. The workload on the user of an automation system can be reduced by concealing internal communication specifications or internal communication conditions, which leads to a reduction in the external view of the technology to assignments in the symbolic field. The user models interfaces, wherein technological attributes are defined appropriately and the attributes are used to simplify the user's perspective and assignment of the communication channels via the system. Attributes may in particular be used for sensor assignment for objects which transmit the sensor data by means of a PROFIdrive telegram.

If a communication is to be programmed or parameterized by sensor data, without being assigned logical addresses by a user himself, this can take place, for example, as follows. In a method provided for this purpose for communication between function modules in drive engineering, wherein a first function module has a first sensor interface, wherein a second function module has a second sensor interface, the first sensor interface is functionally assigned to the second sensor interface. This takes place, for example, by means of a graphical user interface, with interfaces of the function module being linked to one another. In particular the first function module can be assigned to a first automation component and the second function module to a second automation component. In particular an address, in particular a logical address, for transfer of sensor data between the two different automation components is specified automatically. Communication between the automation components is supported by a bus system for transmitting data.

According to an advantageous feature of the present invention, the first function module may be an axis module, and the second function module may be a drive module. Therefore the first automation component may be a control device and/or regulating device, in particular a motion control unit, and the second automation component may be a power converter.

According to an advantageous feature of the present invention, the axis module may be based on an axis object, which is instantiated, wherein the axis object has descriptive data for interfaces, wherein interface data is generated by the instantiation, wherein the first sensor interface is an interface datum.

According to an advantageous feature of the present invention, the drive module may be based on a drive object, which is instantiated, wherein the drive object has descriptive data for interfaces, wherein interface data is generated by the instantiation, wherein the first sensor interface is an interface datum.

According to an advantageous feature of the present invention, the sensor interfaces may be linked graphically. If the sensor interfaces are of different types, in the case of interconnection sensor interfaces of different types a connection is automatically denied and/or a faulty connection displayed. If the interfaces are of the same type, the connection is accepted by the system. The system is, for example, an engineering system.

According to an advantageous feature of the present invention, the automatically specified logical address of the bus communication may be used for sensor signals. The logical addresses for bus communication may change automatically if communication interfaces, in particular sensor interfaces, are changed. This is the case if e.g. sensor connections are deleted or new sensor connections are created.

According to another aspect of the inventive method for communication between function modules in drive engineering, a first function module of an automation system has a plurality of sensor interfaces, wherein a second function module of a peripheral component also has a plurality of sensor interfaces. A data connection between the automation system and the peripheral component is provided by means of a communication bus, wherein the peripheral component has hardware ports for a plurality of sensors which are individually connected to the peripheral component and not jointly via a shared bus. In the peripheral component the hardware ports have at least data connections with the sensor interfaces of the peripheral component, wherein the sensor interfaces in particular concern a communication bus.

According to an advantageous feature of the present invention, the bus may have a bus protocol for a plurality of sensors and at least one actor, wherein one of the connected sensors is a motor sensor.

For a user the option of a simple symbolic interconnection of I/O interfaces (in other words, communication interfaces) via an appropriate tool is significant. Software can be provided for this by means of which at least one of the functions described below is provided for the interconnection of interfaces:

an input variable for the software is an I/O interface, or an external interface of a technological object, hereinafter also referred to as "interface to be interconnected", which should be interconnected with another, type-compatible I/O interface on the same device or another device, hereinafter referred to as "partner interface", I/O interface descriptive data being available for both interfaces, the I/O interfaces are displayed with symbolic identifiers, type-based selection lists are displayed for the selection of the partner interface, also indicated is whether the target interfaces are already interconnected, whether if applicable the target interfaces can be interconnected many times properties regarding the interface to be interconnected and the destination interface are displayed, the type of interface is displayed, if the type of interface to be interconnected is one contained in a superordinated type, e.g. element in a structure, or "Bit" or "BOOl" type in a BYTE, WORD, the corresponding substructures, elements, contained data types can be navigated;

in the case of corresponding more extensive modeling, settings involving the partner interface can be directly activated from the interconnection tool, where I/O descriptive data is not available for an I/O interface, specification of the immediate communication memory can take place via specification of the memory address or logical address.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a first interconnection between components;

FIG. 6 shows a second interconnection between components;

FIG. 9 shows a second screen display of interconnections;

FIG. 10 shows a third screen display of interconnections;

FIG. 14 shows an axis configuration; and

DETAILED DESCRIPTION OF PREFERRED EMBODIMENTS

Figure 1:
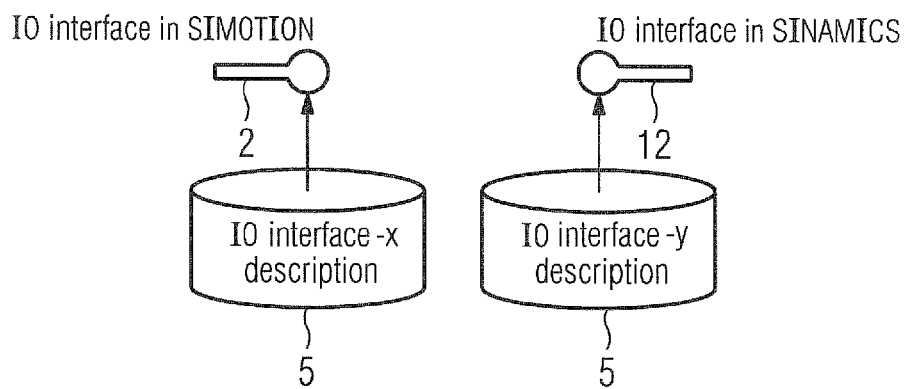
FIG. 1 shows communication interfaces with descriptive data according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
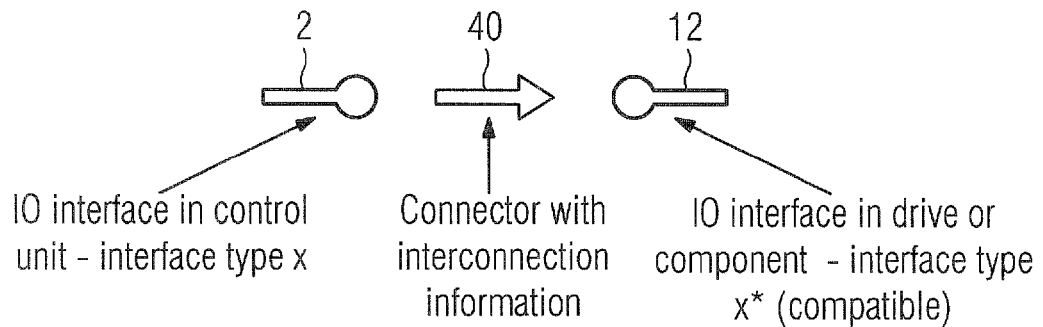
FIG. 2 shows a connector interconnection.

Turning now to the drawing, and in particular to FIG. 1, there is shown a first communication interface 2 and a second communication interface 12. Both communication interfaces have descriptive data 5: I/O interface x description and I/O interface y description. As shown in FIG. 2, the interfaces 2 and 12 can be symbolically connected by means of a connector 40. As per FIG. 2 the first interface 2 concerns a control unit and the second interface a drive, wherein both interfaces are of the same type x and can therefore be connected to each other.

With the aid of such communication interfaces 2, 12 with type description, various advantages can be obtained, such as e.g.:

a simple, transparent, type-assured, symbolic assignment of I/O points to I/O interfaces of objects which are on the same or in particular on different, distributed components, a simple method for transparent and type-assured symbolic assignment of I/O points for local and/or also distributed I/O interfaces and in automation systems, by means of:
Modeling of the I/O interfaces
Type-assured interconnection of I/O interfaces
Establishing the internal communication from the modeling data and the interconnection information via the system;

Automated generation of modeling data for the interfaces by means of script files, Automatic provision of script data with the components or modules, or provision in the engineering system, Generation of the I/O descriptive data from data, parameters, current settings of objects and components, Use of I/O interfaces as I/O variables in an automation system, or also external interfaces of individual objects, in particular technological objects, Storage of the connectors with the assignment information of the I/O interfaces, with a plan, Application of type-based interfaces also on automation systems, which in the runtime system only exchange data via the log, address range, if the resolution of the symbolic assignment, the specification of communication and the logical addresses takes place in the engineering system;

Optional storage of the symbolic assignments in the runtime system for readout for an HMI operating system, Diagnostic display of objects with connectors, assignments in lists or graphically, and/or Re-planning of properties, attributes from the graphical interconnection.

Figure 3:
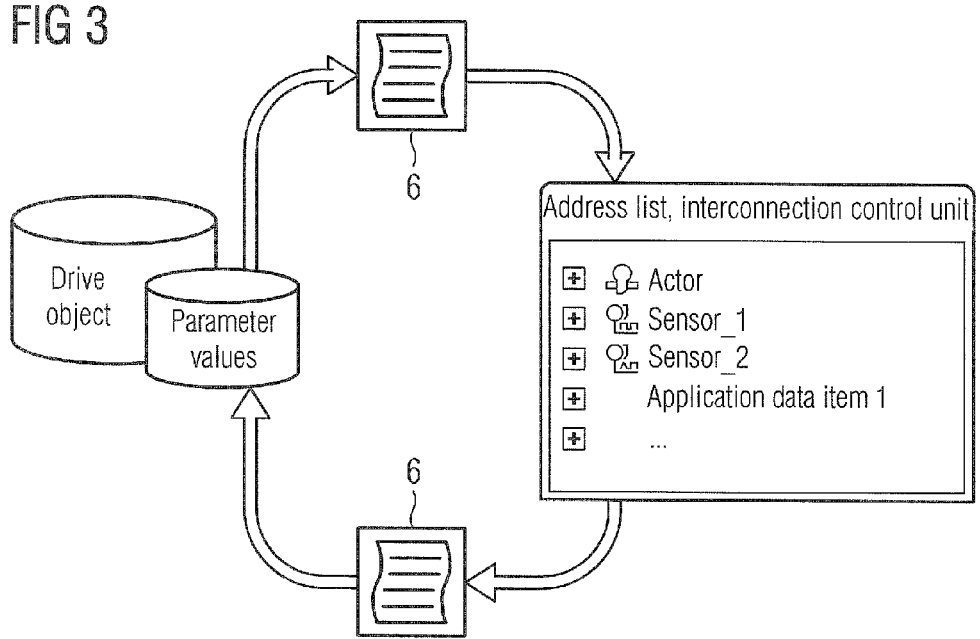
FIG. 3 shows script processing.

The illustration as per FIG. 3 shows the use of script files 6 for generation of I/O modeling data. Object data, parameter data or readable properties and descriptive data are used for this purpose. This is shown in FIG. 3 using the example of a drive object. Taking the address list as a starting point, a second script 6 optionally also allows a telegram to be set on the basis of the interfaces required by a user. In this way the circuit to the parameter data is closed. For a drive object, for example, the following type-related descriptive data may be required:

Description of all possible interfaces and possible properties (maximum configuration), Script for ascertaining current interfaces from parameter values, and Script for setting the telegram based on required interfaces (optional).

Figure 4:
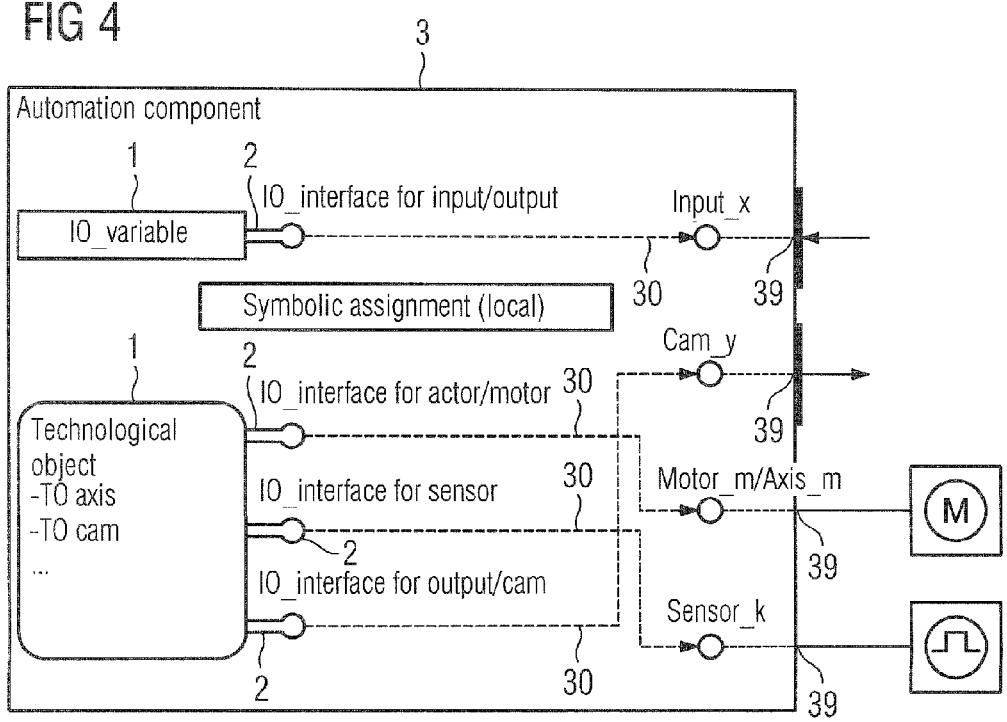
FIG. 4 shows an automation component.

The illustration as per FIG. 4 shows a symbolic assignment with the aid of I/O interface modeling. A first automation component 3 such as e.g. a control unit is shown. Here user I/O interfaces 2 and hardware interfaces 39 are found on the same component. For example, a motor M and a sensor are connected to the hardware interfaces 39. The hardware interfaces 39 are symbolically assigned via connections 30. The assignment concerns e.g. a first function module 1, which is a technology object (e.g. the technology object cam or the technology object axis). The hardware interfaces 39 at the I/O points shown concern as depicted e.g. inputs, outputs, actor/motor/drive, or encoder/sensor.

Advantageously the interfaces can be variably modeled, which is due to the introduction of connectors for the interconnection of interfaces in particular in the engineering system. As a result technological system modeling with regard to I/O interfaces and system communication is possible. During the interconnection process the user is e.g. supported in such a way that only type-compatible interconnections from interconnection points that are still free are permissible. The system communication is created from interconnection, modeling and if appropriate supplementary rules, wherein the internal communication and associated settings can be concealed from the user. Modeling and graphical connector interconnection can be used for application-specific and technology-compatible engineering so that planning of assignments is possible at a user-related, technological level.

The illustration as per FIG. 5 shows two automation components 3, 13. The first automation component has a technology object 1 as a function module. The module has interfaces 2, which are connected via connectors 30 to I/O points 12, that is to say interfaces of an additional component 13. The component 13 is a peripheral component, to which hardware such as a sensor 10 or a motor cable of a motor 9 is connected via hardware ports 39. The connectors 30 between the components 3 and 13 are shown by dashed lines. The real bus between the components 3 and 13 is indicated by a network structure with branches to the components, which is shown by solid lines. As per FIG. 5 a distributed assignment to I/O points 12 is shown as interfaces, with the interfaces 12 being directly assigned to hardware ports 39. The illustration as per FIG. 6 differs from that in FIG. 5 to the effect that assignment takes place indirectly. This means that the interfaces 2 of modules 1 of the component 3 are at least partially connected to interfaces 12 of the modules 11 of the component 13 first. Intelligent peripheral objects are involved. These modules 11 are then linked to ports 39 of the component 13.

Figure 7:
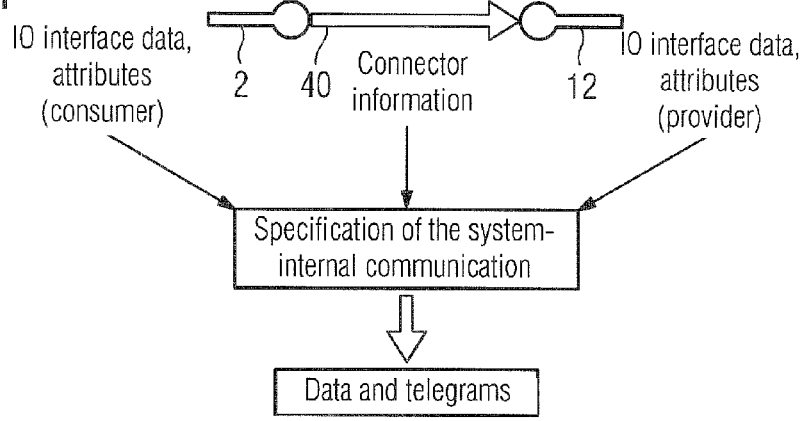
FIG. 7 shows processing of interconnection data.

The illustration as per FIG. 7 shows interfaces 2 and 12, which are connected via a connector 40. Information data is assigned to both interfaces 2 and 12 as well as the connector 40 (in particular type-specific information data). The system-internal communication is determined on the basis of this information data. Data then result from this with regard to the telegram structure for the bus between automation components.

Figure 8:
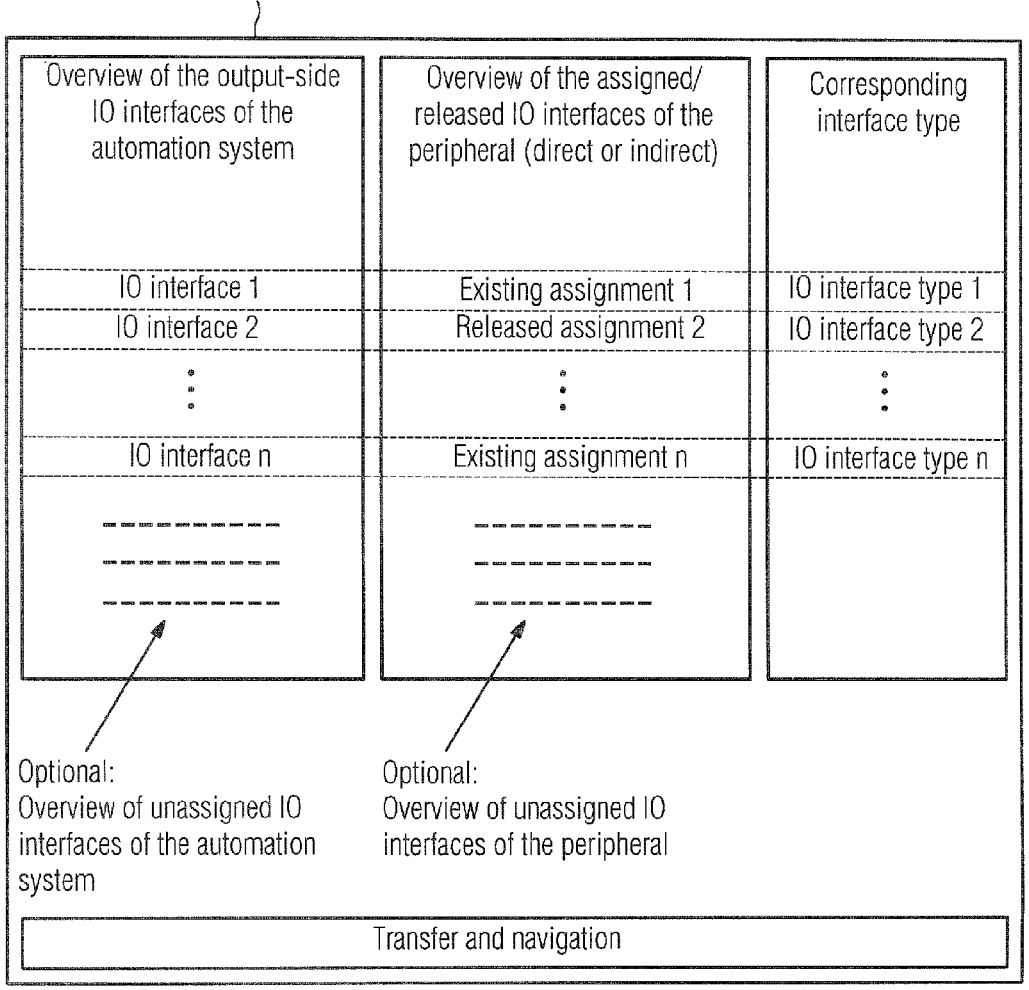
FIG. 8 shows a first screen display of interconnections.

The illustration as per FIG. 8 shows a screen display 15, which provides a user with an overview of interconnections. This also then enables the user to correct interconnections.

The illustration as per FIG. 9 shows an additional screen display 15 for interconnections of interfaces. For a better understanding, marker points 1 to 5 are set, which describe the aim or function of the respective display:

1. Name of the object for which an interconnection (link) was lost (old destination which is no longer connected);
2. Specification of the destination object, that is to say, of the object with which a new interconnection is to be created. This can take place completely for an entire drive object (actor, Sensor_1, Sensor_2, BICO, etc.) as shown in the first rows or in detail individually for each interface (shown in the last 5 occupied rows). The system must not however make a pre-selection for this;
3. An open tree for drive_1 is shown. Open it is discernible which interconnections have been newly connected. The left side (source) specifies e.g. the interface of a motion control unit; the right side (target), the interface beneath the object the interconnections of which are to be reestablished;
4. In the event that a suitable object does not exist, there is an entry in the selection list; if this entry is selected, then the interconnections concerned remain unchanged; and
5. Advantageously a user can individually interconnect every interface as required.

The illustration as per FIG. 10 shows a further possibility for a screen display for presentation of interconnection information.

Figure 11:
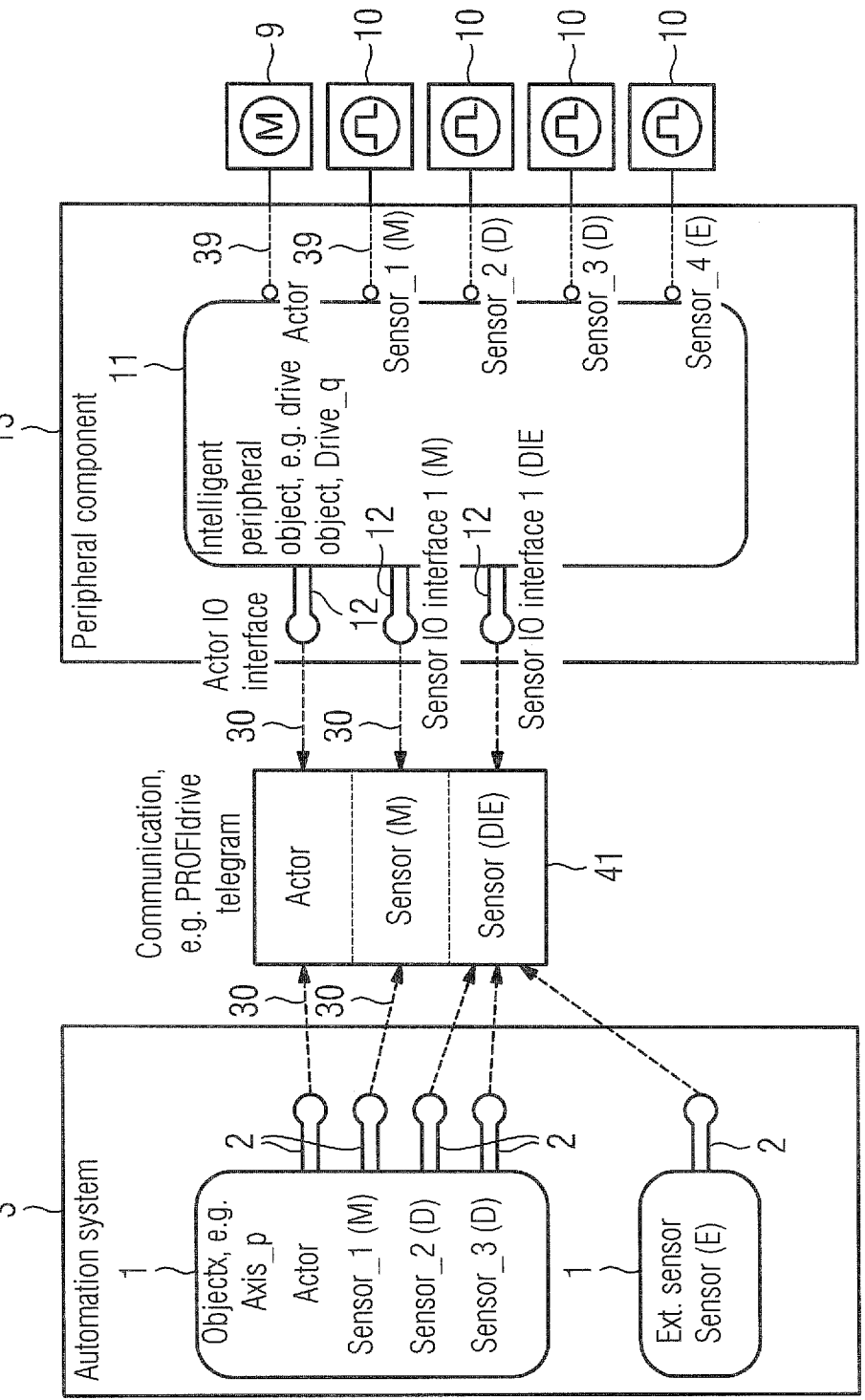
FIG. 11 shows a first interconnection of a large quantity of sensor data.

The illustration as per FIG. 11 shows an example of an interconnection of sensor data. An axis object 1 is shown, which has interfaces 2 for an actor and 3 sensors. In addition, there is also an additional object 1 for an external sensor. The interfaces 2 are transmitted via an automatically generated telegram from the first automation component 3 to the second automation component 13. The second automation component 13 is a peripheral component, which has ports 39 for a motor 9 and sensor 10 ready. In a function module 11, which is programmed as an object, the connections 39 are connected to the interfaces 12.

Figure 12:
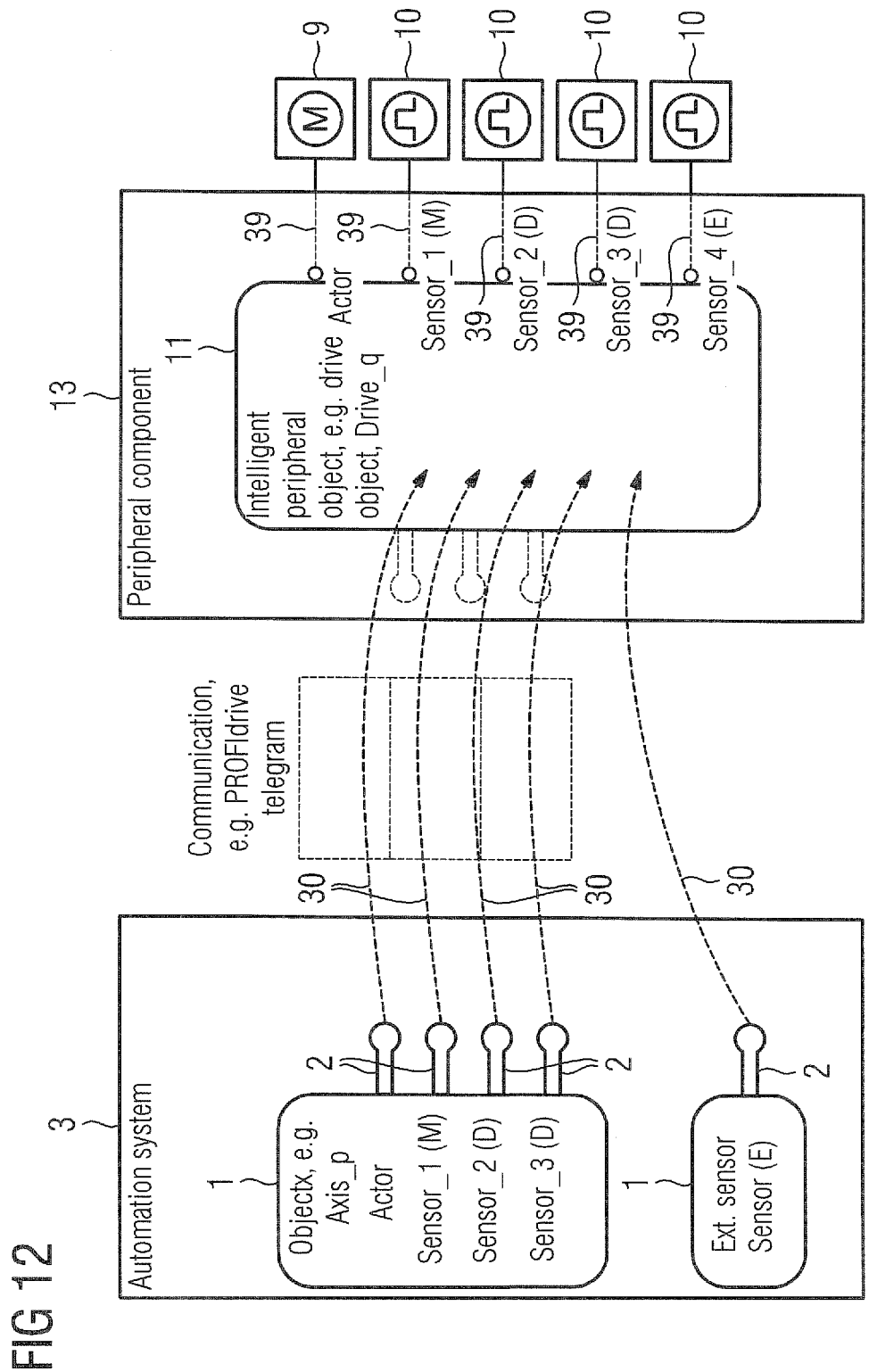
FIG. 12 shows a second interconnection of a large quantity of sensor data.

The illustration as per FIG. 12 shows in addition to FIG. 11, that the interconnection 30 between the components 3 and 13 takes place graphically and the following assignment is produced in the process. The axis_p is assigned to drive_q (axis/actor is interconnected by the system).

Axis_p_Sensor_1 is also assigned to drive_q (motor sensor_1(M) is interconnected to sensor I/O interface 1 by the system).

Axis_p_Sensor_2 is also assigned to drive_q (direct sensor is interconnected to sensor I/O interface 2 by the system).

Axis_p_Sensor_3 is also assigned to drive_q (direct sensor is interconnected to sensor I/O interface 2 by the system).

The external sensor is assigned to drive_q (external sensor is interconnected to sensor I/O interface 2 by the system).

For the interconnection of sensor data via two components 3, 13, objects 1, 11 with interfaces are therefore provided in every component, wherein the interfaces can be graphically connected without address details and addresses and telegram generation can be automatically ascertained from the interface information. In particular, descriptive data such as symbolic identifiers, type information, etc. are available for the interconnection of interfaces.

Figure 13:
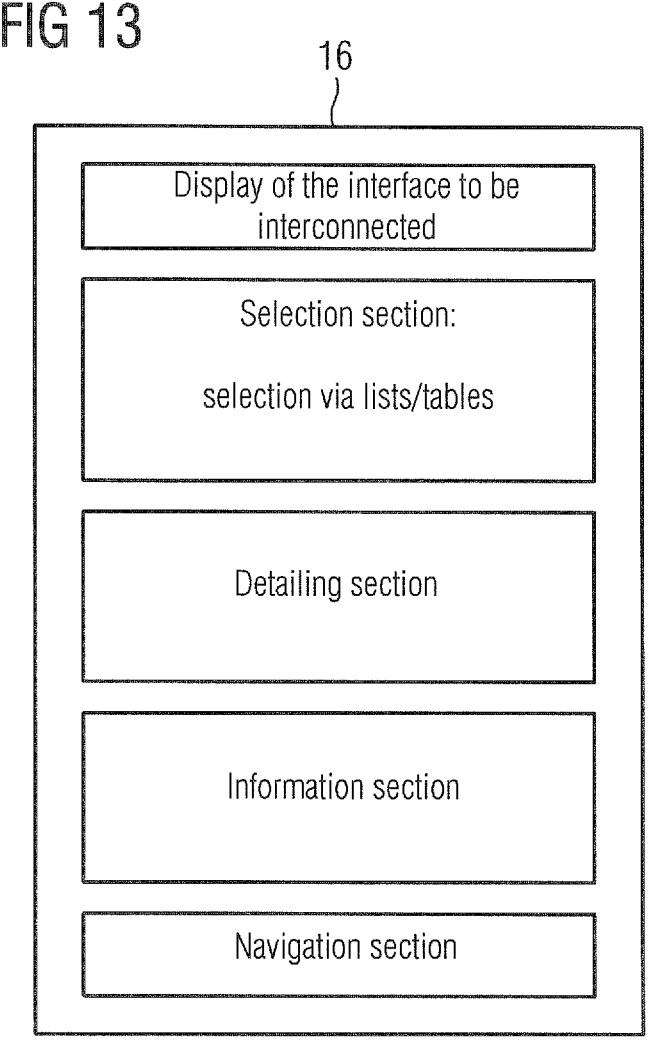
FIG. 13 shows the basic structure of an interconnection control.

The illustration as per FIG. 13 shows a structure for interconnection control, wherein it is shown which segments such a representation 16 can have.

The illustration as per FIG. 14 shows how an axis configuration and a drive assignment can be represented to a user on a screen 15. In this way, interconnections of an axis can be presented in a simple manner.

Figure 15:
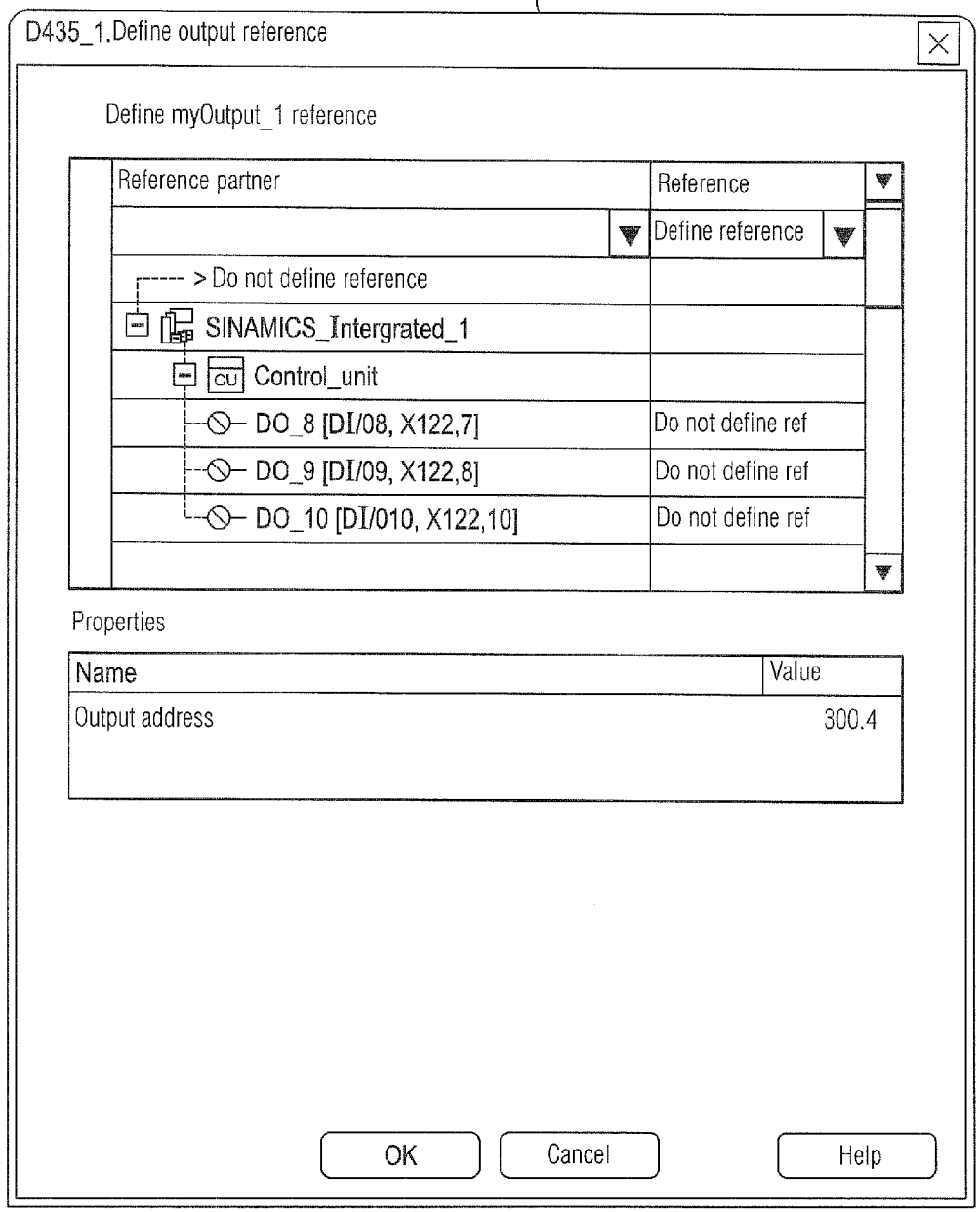
FIG. 15 shows a display of output references (output reference).

The illustration as per FIG. 15 shows an example of an interconnection of I/O points.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and included equilalents of the elements recited therein:

What is claimed is:

1. A method for communication between function modules in drive engineering, wherein a first function module has a first sensor interface and a second function module has a second sensor interface, comprising the steps of:
   assigning the first sensor interface functionally to the second sensor interface,
   assigning the first function module to a first automation component,
   assigning the second function module to a second automation component, and
   automatically specifying an address for transfer of sensor data,
   wherein the first function module is an axis module and the second function module is a drive module, with the axis module being based on an axis object which is instantiated, wherein the axis object has descriptive data for the first interface, wherein the instantiated object generates first interface data, wherein the first sensor interface is a first interface datum, and
   wherein the interfaces with which the object is instantiated are defined during instantiation.

2. The method of claim 1, wherein the address is a logical address.

3. The method of claim 1, wherein the drive module is based on a drive object which is instantiated, wherein the drive object has descriptive data for the second interface, wherein instantiated object generates second interface data, wherein the second sensor interface is a second interface datum.

4. The method of claim 1, wherein the first and second sensor interfaces are graphically linked, wherein a connection is automatically denied or a faulty connection is displayed when the linked sensor interfaces are of different types.

5. The method of claim 2, wherein the logical address is automatically selected in a bus communication.

6. The method of claim 5, wherein logical addresses for a bus communication change automatically commensurate with a change in the first and second sensor interfaces.

* * * * *